United States Patent
Inoue et al.

(10) Patent No.: US 8,658,725 B2
(45) Date of Patent: Feb. 25, 2014

(54) MATERIAL HAVING CROSS-LINKED POLYROTAXANE, AND METHOD FOR PRODUCING SAME

(75) Inventors: Katsunari Inoue, Kashiwa (JP); Yuki Hayashi, Tokyo (JP); Junko Inamura, Ibaraki (JP)

(73) Assignee: Advanced Softmaterials Inc., Kashiwa-shi (JP)

( * ) Notice: Subject to any disclaimer, the term of this patent is extended or adjusted under 35 U.S.C. 154(b) by 0 days.

(21) Appl. No.: 13/580,373

(22) PCT Filed: Mar. 1, 2011

(86) PCT No.: PCT/JP2011/054571
§ 371 (c)(1),
(2), (4) Date: Aug. 21, 2012

(87) PCT Pub. No.: WO2011/108514
PCT Pub. Date: Sep. 9, 2011

(65) Prior Publication Data
US 2012/0316278 A1 Dec. 13, 2012

(30) Foreign Application Priority Data
Mar. 2, 2010 (JP) ................................. 2010-044924

(51) Int. Cl.
*C08K 3/24* (2006.01)
(52) U.S. Cl.
USPC ............ 524/413; 524/403; 524/408; 524/439
(58) Field of Classification Search
USPC .......... 525/54.2, 54.4, 55; 524/430–434, 437, 524/403, 408, 413, 439
See application file for complete search history.

(56) References Cited

U.S. PATENT DOCUMENTS

| | | |
|---|---|---|
| 2003/0138398 A1 | 7/2003 | Okumura |
| 2009/0127979 A1 | 5/2009 | Takeuchi |
| 2009/0214871 A1* | 8/2009 | Fukuda et al. ................. 428/413 |
| 2009/0215919 A1 | 8/2009 | Ito |
| 2009/0312490 A1 | 12/2009 | Ito |
| 2009/0312492 A1 | 12/2009 | Ruslim |
| 2011/0105688 A1 | 5/2011 | Ruslim |
| 2011/0124823 A1* | 5/2011 | Hayashi et al. ............... 525/424 |

FOREIGN PATENT DOCUMENTS

JP 2008-045055 A 2/2008

OTHER PUBLICATIONS

International Search Report mailed Apr. 12, 2011, issued in corresponding International Application No. PCT/JP2011/054571, filed Mar. 1, 2011, 2 pages.

* cited by examiner

*Primary Examiner* — Peter Szekely
(74) *Attorney, Agent, or Firm* — Christensen O'Connor Johnson Kindness PLLC

(57) ABSTRACT

Disclosed are a material having high flexibility and a high dielectric constant, and a method for producing same: a material having a first polyrotaxane and a second polyrotaxane, wherein the first polyrotaxane comprises first blocking groups being disposed at both ends of a first pseudo-polyrotaxane—formed from the opening of a first circular molecule being enclathrated by being skewered by a first linear chain molecule—in a manner so that the first circular molecule does not detach; the second polyrotaxane comprises second blocking groups being disposed at both ends of a second pseudo-polyrotaxane—formed from the opening of a second circular molecule being enclathrated by being skewered by a second linear chain molecule—in a manner so that the second circular molecule does not detach; said first and second polyrotaxane are formed from crosslinking with the first and second circular molecules therebetween; said material is solvent free; and the material has a dielectric constant at 1 kHz of at least 6.0.

13 Claims, 1 Drawing Sheet

MATERIAL HAVING CROSS-LINKED POLYROTAXANE, AND METHOD FOR PRODUCING SAME

TECHNICAL FIELD

The present invention relates to a material comprising a crosslinked polyrotaxane, which is solvent free, and has desired high dielectric constant, and a method of producing the material.

BACKGROUND ART

A polyrotaxane is expected to be useful in various applications because of its viscoelasticity, and thus various materials comprising the polyrotaxane have been developed (see, for example, Patent Document 1).

On the other hand, especially in the care welfare field, there are strong needs for an operation support device which can be used easily, and which is light, with a rapid advance of an aged society. The conventional operation support device used an electromagnetic motor for the drive system, and thus had the fault that it was difficult to save the weight of the support device. For this reason, development of the actuator excellent in lightweight nature, a response, durability, and safety is desired. Although various types of the actuator have been proposed, the dielectric actuator using a polymer has been especially expected, in order to solve the above problems (see, for example, Patent Document 2).

PRIOR ART DOCUMENT

Patent Document

Patent Document 1: WO 2008/108411.
Patent Document 2: JP-A-2009-124875.

DISCLOSURE OF THE INVENTION

Problems to be Solved by the Invention

However, although a use which requires high dielectric constant material, for example, the conventional dielectric actuator had an ability to respond very quickly, there was a problem that the high voltage was required. Therefore, there were problems in safety in view of a dielectric breakdown, an electric shock and the like. In order to realize an actuator driving with the low voltage, the high dielectric elastomer which has high flexibility and a high dielectric constant is needed, but there is still no material which can fully meet with the requirements.

Means for Solving Problems

An object of the present invention is to provide a material, which solves the above-described problems.

Specifically, an object of the present invention is to provide a material having high flexibility and a high dielectric constant.

Further, in addition to the above-described object, an object of the present invention is to provide a method for producing the above-described material.

The present inventors have found that a polyrotaxane having a movable crosslinking point is used to obtain extremely flexible material and that a cyclic molecule used as the movable crosslinking point of the crosslinked body is modified, to have found following inventions:

<1> A material comprising a first polyrotaxane and a second polyrotaxane,
wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s),
the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s),
the first and second polyrotaxanes are crosslinked with each other via the first and second cyclic molecules,
the material is free from solvent, and
the material has a dielectric constant at 1 kHz of 6.0 or more, preferably 8.0 or more, more preferably 10.0 or more.

<2> In the above item <1>, the material may have an initial modulus of 10 MPa or less, preferably 5 MPa or less, more preferably 1 MPa or less.

<3> In the cross-linking of the above item <1> or <2>, the material may have a polymeric moiety between the first and second cyclic molecules, wherein the polymeric moiety may have repeating units, which may be selected from the group consisting of polyethers, polyesters and polycarbonates, of at least 5, preferably 10 or more, more preferably 20 or more. Preferably, the repeating units may be polyethers or polycarbonates, more preferably polyethers.

<4> In the above item <3>, the polymeric moiety may have a number average molecular weight ranging from 300 to 10000, preferably from 800 to 8000, more preferably from 1000 to 6000.

<5> In the above item <3> or <4>, each of the first and second cyclic molecules may have a first active group and a second active group, respectively,
the polymeric moiety may have a first reactive group and a second reactive group at both ends,
the first active group and the first reactive group are, and the second active group and the second reactive group are directly bound to each other via a chemical bonding to form crosslinking.

<6> In any one of the above items <1> to <5>, the first cyclic molecule and/or the second cyclic molecule each may have a first graft chain and/or a second graft chain, the first graft chain and/or the second graft chain each may be independently selected from the group consisting of polyesters and polycarbonates, and a copolymer thereof. Preferably, the first graft chain and/or the second graft chain each may be independently polyesters or polycarbonates, more preferably polyesters.

<7> In any one of the above items <3> to <6>, the first cyclic molecule and/or the second cyclic molecule each may have the first graft chain and/or the second graft chain, the first graft chain and/or the second graft chain each may be selected from the group consisting of polyesters and polycarbonates, and a copolymer thereof,
the first cyclic molecule and/or the second cyclic molecule may be crosslinked via a part of or all of the first graft chain(s), and/or via a part of or all of the second graft chain(s), and via the polymeric moiety. Preferably, the first and second graft chains each may be independently polyesters or polycarbonates, more preferably polyesters.

<8> In any one of the above items <1> to <7>, the first cyclic molecule and/or the second cyclic molecule each may have a third graft chain and/or a forth graft chain, each of which is derived from a monomer having a hydroxyl group or a monomer having a cyano group. In the above item <6> or <7>, in particular, the first graft chain and/or the second graft chain each may have independently the third graft chain and/or the forth graft chain, each of which is derived from the monomer having the hydroxyl group or the monomer having the cyano group at another end. Preferably, the third graft chain and/or the forth graft chain each may be independently polyacrylonitrile, poly(2-cyanoethylacrylate) or poly(2-hydroxyethylmethacrylate), more preferably polyacrylonitrile or poly(2-hydroxyethylmethacrylate).

<9> In any one of the above items <1> to <8>, the material may further comprise at least one powder selected from the group consisting of metal oxides, metal hydroxides, metals and carbon. In particular, the powder may be metal oxides.

<10> In the above item <9>, the powder may be selected from the group consisting of barium titanate, strontium titanate, alumina and aluminum hydroxide, preferably selected from the group consisting of barium titanate, strontium titanate and alumina, more preferably barium titanate or strontium titanate.

<11> A method for producing a material comprising a first polyrotaxane and a second polyrotaxane, wherein the first and the second polyrotaxanes are crosslinked, the material is free from solvent, and the material has a dielectric constant at 1 kHz of 6.0 or more, preferably 8.0 or more, more preferably 10.0 or more, comprising the steps of:

a) preparing the first polyrotaxane, which comprises a first pseudopolyrotaxane, which has a first linear molecule and a first cyclic molecule(s) in which the first linear molecule is included in a cavity (cavities) of the first cyclic molecule (s) in a skewered manner, and first capping groups, each of which locates at each end of the first pseudopolyrotaxane in order to prevent the dissociation of the first cyclic molecule(s);

b) preparing the second polyrotaxane which comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s);

c) preparing a crosslinking agent comprising a polymeric moiety having repeating units, which may be selected from the group consisting of polyethers, polyesters and polycarbonates, of at least 5, preferably 10 or more, more preferably 20 or more; and d) mixing and reacting the first polyrotaxane, the second polyrotaxane, and the crosslinking agent, to crosslink the first and second polyrotaxanes via the polymeric moiety; to obtain the material.

<12> In the above item <11>, the material may have an initial modulus of 10 MPa or less, preferably 5 MPa or less, more preferably 1 MPa or less.

<13> In the above item <11> or <12>, the polymeric moiety may have a number average molecular weight ranging from 300 to 10000, preferably from 800 to 8000, more preferably from 1000 to 6000.

<14> In any one of the above items <11> to <13>, the step a) and/or the step b) may further comprise a step of ring-opening polymerizing a lactone monomer and/or a cyclic carbonate monomer to obtain the first cyclic molecule and/or the second cyclic molecule each having a first graft chain and/or a second graft chain, wherein the first graft chain and/or the second graft chain each may be independently selected from the group consisting of polyesters and polycarbonates, and a copolymer thereof. Examples of the lactone monomer may include, but are not limited to, 4-member cyclic lactone such as β-propiolactone, β-methylpropiolactone, L-serin-β-lactone derivatives and the like; 5-member cyclic lactone such as γ-butylolactone, γ-hexanolactone, γ-heptanolactone, γ-octanolactone, γ-decanolactone, γ-dodecanolactone, α-hexyl-γ-butylolactone, α-heptyl-γ-butylolactone, α-hydroxy-γ-butylolactone, γ-methyl-γ-decanolactone, α-methylene-γ-butylolactone, α,α-dimethyl-γ-butylolactone, D-erythronolactone, α-methyl-γ-butylolactone, γ-nonanolactone, DL-pantolactone, γ-phenyl-γ-butylolactone, γ-undecanolactone, γ-valerolactone, 2,2-pentamethylene-1,3-dioxolan-4-one, α-bromo-γ-butylolactone, γ-crotonolactone, α-methylene-γ-butylolactone, α-methacryloyloxy-γ-butylolactone, β-methacryloyloxy-γ-butylolactone and the like; 6-member cyclic lactone such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexanecarbonic acid δ-lactone and the like; 7-member cyclic lactone such as ∈-caprolactone and the like; lactide, 1,5-dioxepan-2-one. Further, examples of cyclic carbonate may include, but are not limited to, 5-member carbonate such as ethylene carbonate, propylene carbonate, 1,2-butylene carbonate, glycerol 1,2-carbonate, 4-(methoxymethyl)-1,3-dioxolan-2-one, (chloromethyl)ethylene carbonate, vinylene carbonate, 4,5-dimethyl-1,3-dioxol-2-one, 4-chloromethyl-5-methyl-1,3-dioxol-2-one, 4-vinyl-1,3-dioxolan-2-one, 4,5-diphenyl-1,3-dioxolan-2-one, 4,4-dimethyl-5-methylene-1,3-dioxolan-2-one and the like; 6-member carbonate such as 1,3-dioxan-2-one, 5-methyl-5-propyl-1,3-dioxolan-2-one, 5,5-diethyl-1,3-dioxolan-2-one and the like. Preferably, ∈-caprolactone, γ-butylolactone, α-methyl-γ-butylolactone, δ-valerolactone, lactide may be preferable. ∈-caprolactone may be more preferable. More, the first and second graft chains each may be polyesters or polycarbonates, more preferably polyesters.

<15> In the above item <14>, another end of a part or all of the first graft chain(s) may have a third active group, and/or another end of apart or all of the second graft chain(s) may have a forth active group, the first cyclic molecule and the second cyclic molecule each may have a first active group and a second active group, respectively, the polymeric moiety may have a first reactive group and a second reactive group at both ends, and in the step d), the third active group and/or the forth active group, and the first active group and/or the second active group may be reacted with the first reactive group and/or the second reactive group, to from a crosslinked body via the part or all of the first graft chain(s), and/or the part or all of the second graft chain(s), and the polymeric moiety.

<16> In any one of the above items <11> to <15>, each of the first cyclic molecule and the second cyclic molecule may have a first active group and a second active group, respectively, the polymeric moiety may have a first reactive group and a second reactive group at both ends, in the step d), the first active group may be directly bound to the first reactive group, and the second active group may be directly bound to the second reactive group, to form a crosslinked body.

<17> In any one of the above items <11> to <16>, the method may further comprise a step e) of atom-transfer-radical-polymerizing a monomer having a hydroxyl group and/or a monomer having a cyano group, to obtain the first cyclic molecule and/or second cyclic molecule each independently having a third graft chain and/or a forth graft chain, each of which is derived from the monomer having a hydroxyl group and/or the monomer having a cyano group. In particular, in any one of the above items <14> to <16>, the method may further comprise a step e) of atom-transfer-radical-polymerizing a monomer having a hydroxyl group and/or a monomer having a cyano group, to form, at another end of the first graft chain and the second graft chain, independently, a third graft chain and/or a forth graft chain, each of which is derived from the monomer having a hydroxyl group and/or the monomer having a cyano group. Preferably, the third graft chain and forth graft chain each may be independently polyacrylonitrile, poly(2-cyanoethylacrylate), poly(2-hydroxyethylmethacrylate), more preferably polyacrylonitrile, poly(2-hydroxyethylmethacrylate). The monomer having a hydroxyl group and/or the monomer having a cyano group may preferably be acrylonitrile, 2-cyanoethylacrylate, 2-hydroxyethylmethacrylate, more preferably acrylonitrile, 2-hydroxyethylmethacrylate.

<18> In any one of the above items <11> to <17>, the method may further comprise a step f) of adding to the material at least one powder selected from the group consisting of metal oxides, metal hydroxides, metals and carbon. In particular, the powder may be metal oxides. The step f) may be carried out during the step d), or after the step d). Preferably, the step f) may be carried out during the step d), such that the powder may be added into the material, and that the powder may be included in the material.

<19> In the above item <18>, the powder may be selected from the group consisting of barium titanate, strontium titanate, alumina and aluminum hydroxide, preferably selected from the group consisting of barium titanate, strontium titanate and alumina, more preferably barium titanate or strontium titanate.

<20> In any one of the above items <1> to <19>, each of the first and second cyclic molecules may be selected from the group consisting of α-cyclodextrin, β-cyclodextrin and γ-cyclodextrin.

<21> In any one of the above items <1> to <20>, each of the first and second linear molecules may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. And more specifically, the linear molecule may be selected from the group consisting of polyethylene glycol, polypropylene glycol, polytetrahydrofuran, polydimethylsiloxane, polyethylene and polypropylene, and preferably polyethylene glycol.

<22> In any one of the above items <1> to <21>, each of the first and second linear molecules may have a weight average molecular weight of 3,000 or more, preferably 5,000 to 100,000, more preferably 10,000 to 50,000.

<23> In any one of the above items <1> to <22>, each of the first and second capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, each of the first and second capping group may be selected from the group consisting of dinitrophenyl groups; cyclodextrins; adamantane groups; trityl groups; fluoresceins; and pyrenes, more preferably adamantane groups; or trityl groups.

<24> In any one of the above items <1> to <23>, the first and second cyclic molecules each may be independently derived from α-cyclodextrin, and the first and second linear molecules each may be polyethylene glycol.

<25> In any one of the above items <1> to <24>, each of the first and second linear molecule may independently have the first and second cyclic molecule included in a skewered manner at an amount of 0.001 to 0.6, preferably 0.01 to 0.5, more preferably 0.05 to 0.4 of a maximum inclusion amount, which is defined as an amount at which the first and second cyclic molecules can be included at maximum when the first and second linear molecule has the first and second cyclic molecules included in a skewered manner, and the amount at maximum is normalized to be 1.

Effects of the Invention

The present invention can provide a material having high flexibility and high dielectric constant.

Further, in addition to the above-described effect, the present invention can provide a method for producing the above-described material.

EMBODIMENTS FOR CARRYING OUT THE INVENTION

Figure 1:
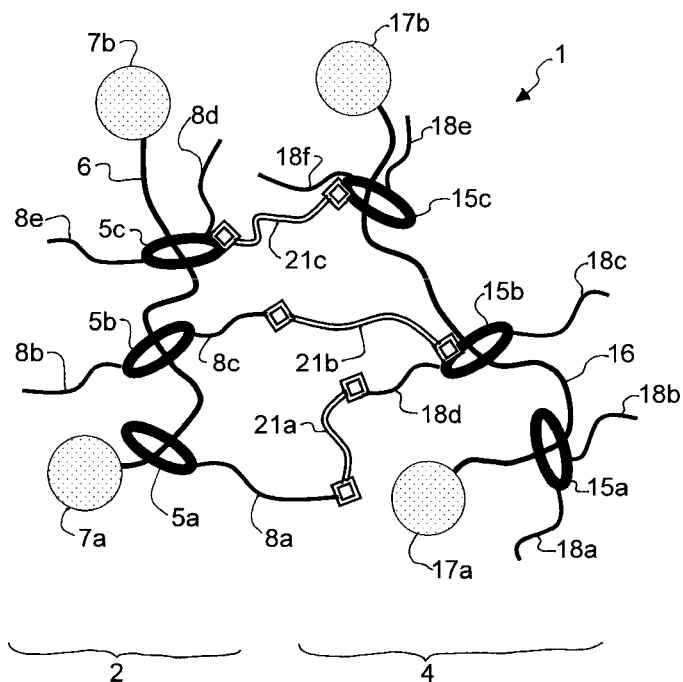
FIG. 1 is a schematic diagram illustrating one embodiment 1 of a crosslinked polyrotaxane in a material according to the present invention.

The present invention will be described in detail hereinafter.

The present invention provides a material comprising a first polyrotaxane and a second polyrotaxane, wherein the first and second polyrotaxanes are crosslinked with each other via the first and second cyclic molecules, the material is free from solvent, and the material has a dielectric constant at 1 kHz of 6.0 or more, preferably 8.0 or more, more preferably 10.0 or more.

Further, the material according to the present invention may have an initial modulus of 10 MPa or less, preferably 5 MPa or less, more preferably 1 MPa or less.

The material according to the present, i.e., the material, which comprises the first and second polyrotaxanes, and which comprises the crosslinked body of the first and second polyrotaxanes, is free from solvent, and the material has a desired dielectric constant at 1 kHz, and thus the material according to the present invention can provide viscoelasticity derived from a crosslinked polyrotaxane, for example, high flexibility.

The term "free from solvent" used herein means that absolutely no solvent is present. However, it may comprise a tiny amount of solvent, i.e., 3 wt % or less (when the whole material is 100 wt %), and preferably 1 wt % or less. Furthermore, it means that the material according to the present invention may comprise a solvent during production, treatment or processing under general conditions, but the solvent amount in the final material is still within the above range.

In the present specification, a dielectric constant can be determined in a manner similar to the conventional procedure:

Alternative current is applied to the sample cell, in which a sample to be measured is sandwiched between parallel plate electrodes. The dielectric constant is calculated from the relation of an impedance, which are determined from a capacitor made from the sample, and a complex dielectric constant of the sample.

Further, in the present specification, an initial modulus can be determined in a manner similar to the conventional procedure:

A stress-strain curve of the measurement sample processed into the dumbbell type (width: 2.04 mm, initial length: 10 mm) is determined by stretching the sample in one axis at the tensile rate of 0.2 mm/s, and then the initial modulus is determined from the slope of linearization for the initial extension of the stress-strain curve.

More, the material according to the present invention has the breaking extension ratio of more than 100%, preferably more than 200%, and more preferably more than 400%.

Herein, the breaking extension ratio can be expressed with the following equation, wherein Lt represents the effective length at the time of breaking, and Lo represents the effective length before extending.

Breaking extension ratio (%)=$\{(Lt-Lo)/Lo\}\times 100$.

The material according to the present invention having the above-described characteristics may be used for wide applications based on the excellent viscoelasticity that is not found for existing elastomers such as urethane elastomer and rubber elastomer. For example, it is expected to obtain a material having a wide low stress region in accordance with the movement of a first cyclic molecule (s) and/or a second cyclic molecule(s). And thus, it is expected to obtain a material having a lower initial modulus even after new function is applied to the material by the addition of a functional powder, or by chemical modification such as grafting to the first cyclic molecule and/or the second cyclic molecule.

Accordingly, it is expected that the material according to the present invention may be used for dielectric actuator materials, magnetic actuator materials, organic dispersed electroluminescence materials, binders for thermal conductive materials, condenser materials and the like.

Furthermore, the material according to the present invention can exhibit a desired dielectric constant and desired flexibility, as well as desired characteristics by the addition of a substance which can provide desired characteristics such as powders as described below.

The material according to the present invention will be explained in more detail.

Each of a first polyrotaxane and a second polyrotaxane has the construction as follows. Specifically, a first (second) polyrotaxane is comprised of a first (second) pseudopolyrotaxane, which comprises a first (second) linear molecule and a first (second) cyclic molecule(s) in which the linear molecule is included in cavities of cyclic molecules in a skewered manner, and a first (second) capping group which locates at each end of the first (second) pseudopolyrotaxane in order to prevent the dissociation of the first (second) cyclic molecule(s).

A first polyrotaxane and a second polyrotaxane may be the same or different. In brief, according to the invention, it is necessary that at least two polyrotaxane molecules are present and at least two of them are crosslinked.

Furthermore, the elements which constitute a first (second) polyrotaxane, i.e., a first (second) cyclic molecule(s), a first (second) linear molecule and a first (second) capping group, will be described below.

The material according to the present invention is constructed by crosslinking the first polyrotaxane and the second polyrotaxane via their each cyclic molecule(s).

Specifically, the crosslinking may be formed such that a crosslinked body has a polymeric moiety between the first and second cyclic molecules. In brief, the crosslinking may be formed by a bonding: "first cyclic molecule-X-polymeric moiety-Y-second cyclic molecule", wherein each of X and Y represents a single bond, or a first bivalent group and a second bivalent group. Furthermore, the first bivalent group and the second bivalent group are described below.

The polymeric moiety may have at least 5, preferably 10 or more, more preferably 20 or more repeating units, which may be selected from the group consisting of polyethers, polyesters and polycarbonates. Further, the polymeric moiety may have a number average molecular weight ranging from 300 to 10000, preferably from 800 to 8000, more preferably from 1000 to 6000.

More specifically, each of the first and second cyclic molecules may have a first active group and a second active group, respectively. The polymeric moiety may have a first reactive group and a second reactive group at both ends, the first active group and the first reactive group may be, and the second active group and the second reactive group may be, directly bound to each other via a chemical bonding to form crosslinking. In this case, X and Y as described above each represents a single bond.

Examples of the polymeric moiety, or the polymeric moiety having a first reactive group and a second reactive group at both ends may include polyethers, polyesters or polycarbonates.

More specific examples may include, but are not limited to, polyethers such as polyethylene glycol diol, polyethylene glycol dicarboxylic acid terminated, polyethylene glycol dithiol acid terminated, polypropylenediol, polytetrahydrofuran, poly(tetrahydrofuran) bis(3-aminopropyl) terminated, polypropylene glycol bis(2-aminopropylether), glycerol propoxylate, glycerol tris[poly(propylene glycol)amino terminated], pentaerythritol ethoxylate, pentaerythritolpropoxylate and the like; polyesters such as poly(ethylene adipate), poly(1,3-propylene adipate)diol terminated, poly(1,4-butylene adipate)diol terminated, poly lactone and the like; polycarbonates such as poly(trimethylene carbonate), poly(1-methyl trimethylene carbonate), poly(2,2-dimethyl trimethylene carbonate), poly(tetramethylene carbonate) and the like. In particular, the polymeric moiety is preferably either polyethers or polycarbonates.

The polymeric moiety may have reactive groups at its both ends based on the reaction between a group contained in the polymeric moiety and a certain group. Examples of imparting the "reactive group" by using the "certain group" may include, but are not limited to, imparting an isocyanate group by using a polyfunctional isocyanate such as hexamethylene diisocyanate, a biuret type, an isocyanurate type and an adduct type of hexamethylene diisocyanate, tolylene 2,4-diisocyanate, isophorone diisocyane, trimethylhexamethylene diisocyanate, xylylene diisocyanate, 1,3-bis(isocyanatomethyl)cyclohexane, (4,4'-methylenedicyclohexyl)diisocyanate and the like; imparting an oxirane group by using an oxirane compound such as epichlorohydrin, epibromohydrin and the like; imparting an oxetane group by using an oxetane compound such as 3-(chloromethyl)-3-methyloxetane and the like; imparting an oxazoline group by using 2,2'-bis(2-oxazoline) and the like; and imparting an aziridine group by using a polyfunctional aziridine PZ-33, DZ-22E (manufactured by Nippon Shokubai Co., Ltd) and the like.

The reactive group may include the above-described groups, and may be selected from the group consisting of an isocyanate group, a thioisocyanate group, an oxirane group, an oxetane group, a carbodiimide group, a silanol group, an oxazoline group, and an aziridine group.

Each of the first and second reactive groups may have two functional groups or more, respectively.

The two functional groups or more may be two groups or more selected from the group consisting of an isocyanate group, a thioisocyanate group, an oxirane group, an oxetane group, a carbodiimide group, a silanol group, an oxazoline group, and an aziridine group.

The first and second cyclic molecules may have a first graft chain and a second graft chain, respectively, other than the above-described first and second active groups or the polymeric moiety via the first and second active groups. Furthermore, one end of each of the first graft chain and the second graft chain is bound to the first cyclic molecule or the second cyclic molecule, respectively.

Each of the first and second graft chains may be independently selected from the group consisting of polyesters and polycarbonates, and a copolymer thereof, preferably polyesters or polycarbonates, more preferably polyesters.

Each of the first and second graft chains may independently have the polymerization degree of 1 to 10, preferably 2 to 9, more preferably 3 to 6, and/or a number average molecular weight of 100 to 1500, preferably 200 to 1300, more preferably 300 to 1000.

The first graft chain, one end of which being bound to the first cyclic molecule, or the second graft chain, one end of which being bound to the second cyclic molecule may be obtained from, for example, ring-opening polymerization of ∈-caprolactone.

In a case where the first cyclic molecule and/or the second cyclic molecule each has the first graft chain and/or the second graft chain, respectively, the crosslinking may be formed via the first graft chain and/or the second graft chain. This means that, in the above-described term "first cyclic molecule-X-polymeric moiety-Y-second cyclic molecule", i) X represents the first graft chain and Y represents a single bond; ii) X represents a single bond and Y represents the second graft chain; or iii) X represents the first graft chain and Y represents the second graft chain. In brief, the material according to the present invention may include, other than a) the above-described "first cyclic molecule-polymeric moiety-second cyclic molecule", the combinations of a) and one, two or all of i) to iii).

Furthermore, in this regard, in a case where the first graft chain and/or the second graft chain form(s) the crosslinking, each of the first graft chain and/or the second graft chain may independently have a 1'st active group or a 2'nd active group, the active groups may be reacted with the first and second reactive groups, each of which locates each end of the polymeric moiety, to form the crosslinking. Furthermore, the active group may be similar to the active groups on the cyclic molecules, as described below.

In a case where the first cyclic molecule and/or the second cyclic molecule each has the first graft chain and/or the second graft chain, respectively, the first graft chain and/or the second graft chain may have a third graft chain and/or a forth graft chain at another end of the first graft chain and/or second graft chain. Each of the third graft chain and/or the forth graft chain may be derived from a monomer having a hydroxyl group or a monomer having a cyano group.

Examples of the monomer having the cyano group may include, but are not limited to, acrylonitrile derivates such as acrylonitrile, vinylidene cyanide, fumaronitrile and the like; cyanoethylacrylate derivatives such as 2-cyanoethylacrylate, 2-cyanoethylmethacrylate and the like.

Examples of the monomer having the hydroxyl group may include, but are not limited to, hydroxyethylacrylate derivates such as 2-hydroxyethyl acrylate, 2-hydroxyethyl methacrylate and the like.

Preferably, the monomer having the cyano group or the monomer having the hydroxyl group may be acrylonitrile, 2-cyanoethylacrylate or 2-hydroxyethyl methacrylate, more preferably acrylonitrile or 2-hydroxyethyl methacrylate.

The third graft chain and/or the forth graft chain may be formed by, for example, the atom transfer radical polymerization method (see, for example, JP-A-H10-509475, Matyjaszewski et. al., *J. Am. Chem. Soc.*, 1995, 117, 5614; *Science*, 1996, 272, 866; Sawamoto et. al., *Macromolecules*. 1995, 28, 1721; WO1996-30421 and the like, whole contents of which are incorporated herein by reference). However, the method for forming the graft chain(s) is not limited thereto.

Each of the third graft chain and/or the forth graft chain may independently have the polymerization degree of 2 to 30, preferably 3 to 25, more preferably 5 to 20, and/or a number average molecular weight of 100 to 4000, preferably 150 to 3500, more preferably 250 to 2500.

Furthermore, in a case where the third (forth) graft chain(s) is(are) existed, the material according to the present invention may have the construction: "first (second) cyclic molecule-first (second) graft chain-third (forth) graft chain", wherein the parenthesis corresponds to, respectively.

Furthermore, in a case of using the atom transfer radical polymerization method, another end of each of the first graft chain and/or the second graft chain may be replaced with an organic halogen compound residue(s), to form a radical polymerization initiation moiety. In this regard, the organic halogen compound residue is not particularly restricted as long as the organic halogen compound residue is a residue of an "organic halogen compound". Examples of the "organic halogen compound" may include, but are not limited to, 2-bromoisobutyryl bromide, 2-bromobutylic acid, 2-bromopropionic acid, 2-chloropropionic acid, 2-bromoisobutyric acid, epichlorohydrin, epibromohydrin, 2-chloroethyl isocyanate, and the like.

The material according to the present invention may further comprise at least one powder selected from the group consisting of metal oxides, metal hydroxides, metals and carbon.

In particular, the powder may be metal oxides or metal hydroxides. Specifically, the powder may be selected from the group consisting of barium titanate, strontium titanate, alumina and aluminum hydroxide, preferably selected from the group consisting of barium titanate, strontium titanate and alumina, more preferably barium titanate or strontium titanate.

The powder may be monocrystal or polycrystal. Further, although a shape of the powder is not particularly restricted, an average particle diameter of the powder may preferably range from 0.01 to 100 µm, more preferably 0.01 to 10 µm. The above-described range can provide good dispersion of the powder and a desired dielectric constant.

Examples of the powder providing a high dielectric constant may include, but are not limited to, $MgSiO_4$, $MgTiO_3$, $ZnTiO_3$, $Zn_2TiO_4$, $TiO_2$, $CaTiO_3$, $SrTiO_3$, $SrZrO_3$, $BaTiO_3$, $BaTi_2O_5$, $BaTi_4O_9$, $Ba_2Ti_9O_{20}$, $Ba_2(Ti, Sn)_9O_{20}$, $ZrTiO_4$, $(Zr, Sr)TiO_4$, $BaNd_2Ti_5O_{24}$, $BaSm_2TiO_{14}$, $Bi_2O_3BaONd_2O_3TiO_2$, $PbOBaONd_2O_3TiO_2$, $(Bi_2O_3, PbO)BaONd_2O_3TiO_2$, $La_2Ti_2O_7$, $Nd_2Ti_2O_7$, $(Li, Sm) TiO_3$, $Ba(Mg_{1/3}Ta_{2/3})O_3$, $Ba(Zn_{1/3}Ta_{2/3})O_3$, $Ba(Zn_{1/3}Nd_{2/3})O_3$, $Sr(Zn_{1/3}Nd_{2/3})O_3$, and the like. In particular, the powder may be preferably $BaTiO_3$, $SrTiO_3$ or the like.

Examples of the powder capable of enhancing thermal conductivity may include, but are not limited to, a high thermal conductive powder such as boron nitride, aluminum nitride, alumina, magnesium oxide, zinc oxide, diamond and the like; a low thermal conductive powder such as silicon nitride, silica, titan dioxide, strontium titanate and the like. Among them, the powder capable of enhancing thermal conductivity may be alumina preferably.

Metal hydroxides can be used as the powder capable of enhancing incombustibility. Among the metal hydroxides, aluminum hydroxide may be preferable in view of the constitution water, acid resistance and alkali resistance.

All of the magnetic powders can be used as long as the magnetic powder is oriented in the directions of lines of magnetic force upon applying magnetic field. Specific examples of the magnetic powders may include, but are not limited to, ferrite system magnets, rare earth elements magnets, γ-iron oxide, chromium dioxide, cobalt/chromium alloy or the like. Examples of ferrite system magnets may include, but are not limited to, ferrite, barium ferrite, strontium ferrite, manganese zinc ferrite, nickel zinc ferrite, copper zinc ferrite and the like. Examples of rare earth elements used in the rare earth elements magnets may include, but are not limited to, samarium, neodymium and the like.

Examples of the powder capable of providing luminescence may include, but are not limited to, zinc sulfide based luminescence powders, calcium aluminate based luminescence powders, strontium aluminate based luminescence powders and the like.

Addition of one or more of the above-described powders to the material according to the present invention can impart the characteristics derived from the powder to the material.

Hereinafter, elements constituting the polyrotaxane will be described respectively.

<<Cyclic Molecule>>

The cyclic molecule is not particularly restricted as long as a linear molecule is included in cavities of the cyclic molecules in a skewered manner.

In a case where the cyclic molecule has an active group, examples of the active group may be derived from a group selected from the group consisting of —OH, —SH, —NH$_2$, —COOH, —SO$_3$H, and —PO$_4$H. Furthermore, the examples of the active group may be applied to a 1'st active group and/or a 2'nd active group.

The cyclic molecule may be, for example, selected from the group consisting of α-cyclodextrin, β-cyclodextrin and γ-cyclodextrin. A part of —OH groups in α-cyclodextrin and the like may be substituted with other group(s), for example, the above-described group. Furthermore, the cyclic molecule may have a group(s) other than the above-described active group.

Examples of the group(s) other than the above-described active group may include an acetyl group, a propionyl group, a hexanoyl group, a methyl group, an ethyl group, a propyl group, a 2-hydroxypropyl group, a 1,2-dihydroxypropyl group, a cyclohexyl group, a butylcarbamoyl group, a hexylcarbamoyl group, a phenyl group, a polycaprolactone group, an alkoxy silane group, an acryloyl group, a methacryloyl group or a cinnamoyl group, or derivatives thereof. These groups on the cyclic molecules can achieve, for a step of producing a crosslinked body, for example, an improvement in solubility of the polyrotaxane in a solvent, an improvement in compatibility with the polymeric moiety, and imparting a certain functional property to the crosslinked body (for example, a water repellent and oil repellent function, a friction controlling function, a photocuring function, a surface adherence improving function, and the like).

<<Linear Molecule>>

The linear molecule of a polyrotaxane according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. More specifically, the linear molecule may be selected from the group consisting of polyethylene glycol, polypropylene glycol, polytetrahydrofuran, polydimethylsiloxane, polyethylene and polypropylene, and preferably polyethylene glycol.

A weight average molecular weight of the linear molecule may be 3,000 or more, preferably 5,000 to 100,000, more preferably 10,000 to 50,000.

In the first (second) polyrotaxane according to the present invention, the first (second) cyclic molecule may be derived from α-cyclodextrin, and the first (second) linear molecule may be polyethylene glycol.

The linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

The maximum inclusion amount of a cyclic molecule can be determined depending on the length of a linear molecule and the thickness of a cyclic molecule. For example, when the linear molecule is polyethylene glycol and the cyclic molecule is α-cyclodextrin molecule, the maximum inclusion amount is measured experimentally (see, Macromolecules 1993, 26, 5698-5703, whole contents of which are incorporated herein by reference).

<<Capping Group>>

The capping group of the polyrotaxane according to the present invention is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

The above-described material according to the present invention, i.e., the material comprising a crosslinked polyrotaxane will be described with reference to the drawing.

FIG. 1 is a schematic diagram illustrating one embodiment 1 of a crosslinked polyrotaxane in a material according to the present invention.

In FIG. 1, one displaced on the left side is derived from the first polyrotaxane 2, another displaced on the right side is derived from the second polyrotaxane, and both of the first and second polyrotaxanes are crosslinked.

The first polyrotaxane 2 comprises a first pseudopolyrotaxane, which has a first linear molecule 6 and first cyclic molecules 5a, 5b and 5c in which the first linear molecule 6 is included in each of cavities of the first cyclic molecules 5a, 5b and 5c in a skewered manner, and first capping groups 7a and 7b, each of which locates at each end of the first linear molecule 6 in order to prevent the dissociation of the first cyclic molecules 5a, 5b and 5c.

Further, the first cyclic molecule 5a comprises a first graft chain 8a, the first cyclic molecule 5b comprises first graft chains 8b and 8c, and the first cyclic molecule 5c comprises first graft chains 8d and 8e, respectively.

In a manner similar to the first polyrotaxane 2, the second polyrotaxane 4 comprises a second pseudopolyrotaxane, which has a second linear molecule 16 and second cyclic molecules 15a, 15b and 15c in which the second linear molecule 16 is included in each of cavities of the first cyclic molecules 15a, 15b and 15c in a skewered manner, and second capping groups 17a and 17b, each of which locates at each end of the second linear molecule 16 in order to prevent the dissociation of the second cyclic molecules 15a, 15b and 15c.

Further, the second cyclic molecule 15a comprises second graft chains 18a and 18b, the second cyclic molecule 15b comprises second graft chains 18c and 18d, and the second cyclic molecule 15c comprises second graft chains 18e and 18f, respectively.

The first polyrotaxane 2 and the second polyrotaxane 4 are crosslinked via the first cyclic molecule 5a and the second cyclic molecule 15b, more specifically via the first cyclic molecule 5a, the first graft chain 8a, a polymeric moiety 21a, the second graft chain 18d, and the second cyclic molecule 15b.

Further, the crosslinking is formed via the first cyclic molecule 5b and the second cyclic molecule 15b, more specifically via the first cyclic molecule 5b, the first graft chain 8c, a polymeric moiety 21b, and the second cyclic molecule 15b.

More, the crosslinking is formed via the first cyclic molecule 5c and the second cyclic molecule 15c, more specifically via the first cyclic molecule 5c, a polymeric moiety 21c, and the second cyclic molecule 15c.

Figure 2:
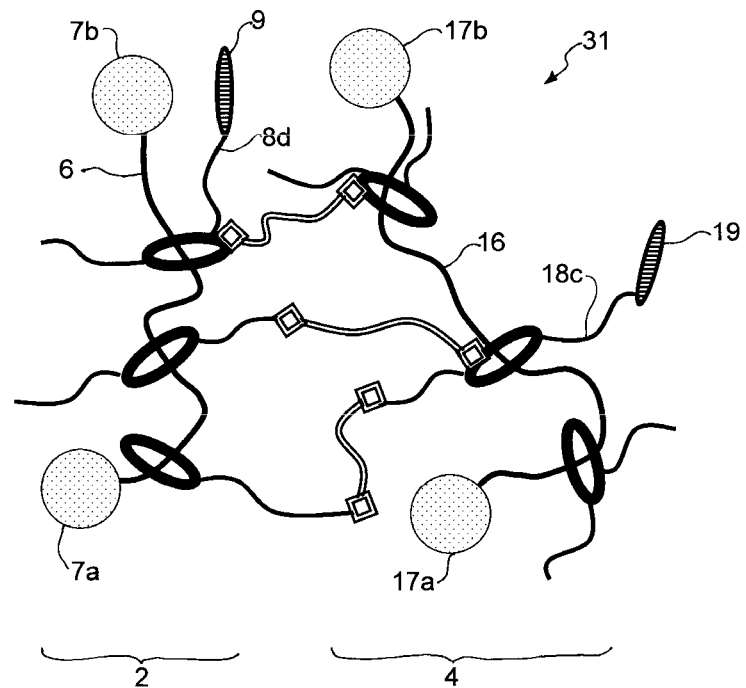
FIG. 2 is a schematic diagram illustrating one embodiment 31 of a crosslinked polyrotaxane in a material according to the present invention.

FIG. 2 is a schematic diagram illustrating one embodiment 31 of a crosslinked polyrotaxane in a material according to the present invention.

The one embodiment 31 of the crosslinked polyrotaxane in FIG. 2 has a similar construction except that the one embodiment 31 comprises a third graft chain 9 at another end of the first graft chain 8d, a forth graft chain 19 at another end of the second graft chain 18c.

The material according to the present invention can be applied to dielectric actuator materials, magnetic actuator materials, organic dispersed electroluminescence materials, binders for thermal conductive materials, condenser materials, and the like. Further, by taking an advantage of the stress-strain characteristics with a wide low stress region, application in materials for low-operation voltage actuators or other piezoelectric elements is highly expected.

More, the material according to the present invention can be applied to electrically insulating materials, materials for electrical/electronic parts, optical materials, friction control agents, biomaterials for medical use, materials for mechanic and/or automobile, building materials and the like.

<A Method of Producing the Material According to the Present Invention>

The material according to the present invention as described above can be obtained by, for example, the following method:

The method comprises the steps of:

a) preparing the first polyrotaxane, wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s), and the first cyclic molecule has a first active group;

b) preparing the second polyrotaxane, wherein the second polyrotaxane comprises a second pseudopolyrotaxane, which has a second linear molecule and a second cyclic molecule(s) in which the second linear molecule is included in a cavity (cavities) of the second cyclic molecule (s) in a skewered manner, and second capping groups, each of which locates at each end of the second pseudopolyrotaxane in order to prevent the dissociation of the second cyclic molecule(s), and the second cyclic molecule has a second active group;

c) preparing a crosslinking agent comprising a polymeric moiety having repeating units, which may be selected from the group consisting of polyethers, polyesters and polycarbonates, of at least 5, preferably 10 or more, more preferably 20 or more; and d) mixing and reacting the first polyrotaxane, the second polyrotaxane, and the crosslinking agent, to crosslink the first and second polyrotaxanes via the polymeric moiety; to obtain the material according to the present invention.

The steps a) and b) are a step of preparing a polyrotaxane. The polyrotaxane can be obtained by referring to documents published before filing the present application (for example, WO2005-080469 and WO2005-108464 (whole contents thereof are incorporated herein by reference)). In a case where the first and second polyrotaxane are same, the steps a) and b) may be carried out in one step. Furthermore, each of the first and second polyrotaxane has the same definition as described above.

The step c) is a step of preparing a crosslinking agent. Furthermore, the polymeric moiety has same definition as described above.

In the step c), the crosslinking agent can be obtained by adding a reactive group to the "polymeric moiety" or to the "polymeric moiety having a first reactive group and a second reactive group" which has been described above. Examples of the step may include, but are not limited to, i) a step of reacting a polymer having a site to which a reactive group may be added with a compound having at least two reactive groups, to obtain the crosslinking agent; and ii) a step of producing a polymeric moiety by polymerizing monomers in accordance with a common method, and during the step, imparting a compound which becomes the reacting group; and the like. Furthermore, the monomer used herein may be a monomer having repeating units.

For the above step i), in general, after a compound having at least two reactive groups are reacted in excess with a polymer, the reaction product may be used as it is or after purification. Examples of the compound having at least two reactive groups may include, but are not limited to, the compounds described in detail above ([0028]) regarding the impartment of the "reactive group" using a "certain group".

Specific examples of the above step ii) may include, but are not limited to, a crosslinking compound obtained by adding glycidyl methacrylate for polymerization of methyl (meth) acrylic acid, a crosslinking compound obtained by adding α-methacryloyloxy-γ-butyrolactone for polymerization of methyl (meth)acrylic acid, a crosslinking compound obtained by condensation polymerization of ethylene glycol and adipic acid to have a terminal carboxylic acid group, and a crosslinking compound obtained by polyaddition of triethylene glycol and hexamethylene diisocyanate to have a terminal isocyanate group.

The step d) is a step of forming a crosslinked body.

The reaction of the step d) may be, in general, carried out in a solvent, depending on the polyrotaxane used, the polymeric moiety used and the like. Examples of the solvent may include, but are not limited to, dimethyl acetamide, dimethyl formamide, tetrahydrofuran, ethyl acetate, butyl acetate, toluene, xylene, acetonitrile, cyclohexanone, methylethyl ketone or acetone, or mixture thereof, depending on a first polyrotaxane and a second polyrotaxane, and a crosslinking agent. Further, conditions may be, but are not limited thereto, room temperature to 100° C. for 5 minutes to 24 hours in the presence of a catalyst, and the like, depending on the reactive group, active group or solvent.

In a case where a solvent is used, various drying steps may be included after step d) in order to obtain the solvent-free material comprising the resulting crosslinked body. More, the method may comprise a step of substituting the solvent with another solvent prior to the step of drying, in order to perform the drying step efficiently.

Examples of the drying step may include, but are not limited to, drying by natural drying based on maintaining at room temperature, drying by heating under normal pressure, drying by heating under reduced pressure, freeze drying, and the like.

The method according to the present invention may further comprise a step of ring-opening polymerizing a lactone monomer and/or a cyclic carbonate monomer to obtain the first cyclic molecule and/or the second cyclic molecule each having a first graft chain and/or a second graft chain.

The first and second graft chains have the same definitions as described above.

The ring-opening polymerization of the lactone monomer and/or the cyclic carbonate monomer may be carried out in a manner similar to the conventionally well-known method, depending on the lactone monomer used and/or the cyclic carbonate monomer used, the first polyrotaxane used and/or second polyrotaxane used. Examples of the method may be the ring-opening polymerization of ∈-caprolactone.

The method according to the present invention may further comprise a step e) of atom-transfer-radical-polymerizing a monomer having a hydroxyl group and/or a monomer having a cyano group, to obtain the first cyclic molecule and/or second cyclic molecule each independently having a third graft chain(s) and/or a forth graft chain(s), each of which is (are) derived from the monomer having a hydroxyl group and/or the monomer having a cyano group.

In particular, in a case where the first cyclic molecule and/or the second cyclic molecule each independently has the first graft chain and/or the second graft chain, the method may further comprise a step e) of atom-transfer-radical-polymerizing a monomer having a hydroxyl group and/or a monomer having a cyano group, to form, at another end of the first graft chain and/or the second graft chain, independently, a third graft chain(s) and/or a forth graft chain(s), each of which is (are) derived from the monomer having a hydroxyl group and/or the monomer having a cyano group. Furthermore, the third and forth graft chains have the same definitions as described above.

The atom transfer radical polymerization may be, depending on the monomer used, the first graft chain used and/or the second graft chain used, the active group used in the first graft chain and/or the second graft chain and the like, carried out with reference to the above-described documents.

The method according to the present invention may further comprise a step f) of adding to the material at least one powder selected from the group consisting of metal oxides, metal hydroxides, metals and carbon.

Furthermore, the powder has same definition as described above.

The step f) may be carried out during the step d), or after the step d). Preferably, the step f) may be carried out during the step d), such that the powder may be added into the material, and that the powder may be included in the material.

The method according to the present invention may further comprise other steps other than the steps a) to f). For example, the method according to the present invention may further comprise a drying step after step d) described above, a step of adding other components to the material during step d) and/or after step d), and a step of washing by using any solvent(s) after the step d), and the like. Examples of the other components may include, but are not limited to, other polymer or oligomer, a plasticizer, a low molecular weight crosslinking agent, a surfactant, a UV absorbent, an antimicrobial agent, and the like.

Examples of other polymer or oligomer among the other components may include, but are not limited to, polyethylene glycol monomethyl ether, polyethylene glycol monobutyl ether, polyethylene glycol dimethyl ether, polypropylene glycol monobutyl ether, mono-hydroxy-terminated polycaprolactone, polycaprolactone, polydimethylsiloxane, mono-hydroxy-terminated polydimethylsiloxane, polycarbonate, mono-hydroxy-terminated polycarbonate, polyester, one-end hydroxylated polyester and the like. Furthermore, other polymer or oligomer may have only one site to which the reactive group can be added, or they may have none. By adding the polymer or oligomer, viscoelasticity, in particular flexibility of the material according to the present invention may be suitably adjusted.

Examples of the plasticizer among the other components may include, but are not limited to, dibutyl phthalate, di-2-ethylhexyl phthalate, butyl benzyl phthalate, dihexyl phthalate, dioctyl adipate, bis(2-ethylhexyl)adipate, tris(2-ethylhexyl)trimellitate, tricresyl phosphate and the like.

Examples of the low molecular weight crosslinking agent among the other components may include, but are not limited to, chlorocyanurate, trimesoyl chloride, terephthaloyl chloride, epichlorohydrin, dibromobenzene, glutaraldehyde, aliphatic polyfunctional isocyanate, aromatic polyfunctional isocyanate, tolylene 2,4-diisocyanate, hexamethylene diisocyanate, divinylsulfone, 1,1'-carbonyl diimidazole, acid anhydrides such as ethylene diamine tetraacetic acid dianhydride, meso-butane-1,2,3,4-tetracarboxylic acid dianhydride, polyfunctional acid hydrazines, polyfunctional carboimides, alkoxysilanes, and derivatives thereof.

Examples of the surfactant among the other components may include, but are not limited to, nonionic surfactants such as polyoxyethylene(8) octyl phenyl ether, sorbitan polyoxyethylene trioleate, sorbitan polyoxyethylene monostearate and the like; and ionic surfactants such as sodium dodecyl sulfate, sodium dodecyl sulfonate, triethanolamine dodecyl sulfate, dodecyltrimethylammonium salts, dodecylpyridinium chloride and the like.

Examples of the UV absorbent among the other components may include, but are not limited to, 2-ethylhexyl paradimethylamino benzoate, 2-ethylhexyl salicylate, 2,4-dihydroxybenzophenone, 2-hydroxy-4-n-octylbenzophenone, 2-(2'-hydroxy-5'-t-butylphenyl)benzotriazole, bis(2,2,6,6-tetramethyl-4-piperidyl)sebacate, 2-ethylhexyl paramethoxycinnamate, isopropyl paramethoxycinnamate, ethylhexyl methoxycinnamate and octyl methoxycinnamate.

Examples of the antimicrobial agent among the other components may include, but are not limited to, a silver, a zinc, a copper compound, or complex or ions thereof; an organo silicon compound; an organo phosphorus compound; and the like.

Examples of the viscosity adjusting agent among the other components may include, but are not limited to, carboxyvinyl polymers, propylene glycol alginate, ethylcellulose, sodium carboxymethylcellulose, polyacrylic acid sodium and the like.

The present invention will be illustrated more specifically by way of following Examples, but is not limited thereby.

Synthetic Example A-1

Preparation of a Crosslinking Agent A-1

A solution, in which 7 g of tolylene-2,4-diisocyanate (Tokyo Chemical Industry, Co., Ltd.) was dissolved in 30 ml of dehydrated toluene under a nitrogen atmosphere, was vigorously stirred at 80° C. Into the solution, a solution of 30 g of both ends diol terminated polypropylene glycol (Mn=3000, Polymerization degree: 50-52, Wako Pure Chemical Industries, Ltd.) dissolved in 60 ml of dehydrated toluene was added dropwise, and stirred for 2 hours. After the reaction, the solvent was removed in vacuo, to obtain a crosslinking agent A-1 comprising polypropylene glycol, both ends of which are modified with isocyanate groups.

Synthetic Example A-2

Preparation of a Crosslinking Agent A-2

A solution, in which 7 g of tolylene-2,4-diisocyanate (Tokyo Chemical Industry, Co., Ltd.) was dissolved in 30 ml of dehydrated toluene under a nitrogen atmosphere, was vigorously stirred at 80° C. Into the solution, a solution of 20 g of polypropylene glycol monobutyl ether (Mn=2500, Polymerization degree: 40-42, Aldrich) dissolved in 50 ml of dehydrated toluene was added dropwise, and stirred for 2 hours. Into the solution, a solution of 30 g of both ends diol terminated polypropylene glycol (Mn=3000, Polymerization degree: 50-52, Wako Pure Chemical Industries, Ltd.) dissolved in 50 ml of dehydrated toluene was added dropwise, and stirred for more 2 hours. After the reaction, the solvent was removed in vacuo, to obtain a crosslinking agent A-2 comprising polypropylene glycol, both ends of which are modified with isocyanate groups and polypropylene glycol monobutyl ether, one end of which is modified with isocyanate group.

Synthetic Example A-3

Preparation of a Crosslinking Agent A-3

A solution, in which 10 g of tolylene-2,4-diisocyanate terminated polypropylene glycol (Mn=2300, Polymerization degree: 33-36, Aldrich) was dissolved in dehydrated toluene (10 ml) under a nitrogen atmosphere, was vigorously stirred at 80° C. Into the solution, a solution of 4.35 g of both ends diol terminated polypropylene glycol (Mn=3000, Polymerization degree: 50-52, Wako Pure Chemical Industries, Ltd.) dissolved in 30 ml of dehydrated toluene was added dropwise, and stirred for 5 hours. After the reaction, the solvent was removed in vacuo, to obtain a crosslinking agent A-3 comprising polypropylene glycol, both ends of which are modified with isocyanate groups (Mn=7600, Polymerization degree: 83-88).

Synthetic Example A-4

Preparation of a Crosslinking Agent A-4

1.9 g of 1,3-bis(isocyanatomethyl)cyclohexane (manufactured by Tokyo Chemical Industry, Co., Ltd.) was dissolved in 0.67 g of xylene. Into the solution, 0.8 g of polycarbonate diol (polycarbonate consisting of 96 wt % or more of polyalkylene carbonate diol, 2 wt % or less of 1,5-pentanediol, and 2 wt % or less of 1,6-hexanediol, Duranol (trade mark) T-5650) manufactured by Asahi Kasei Chemicals Corp.) was added dropwise with stirring, and further stirred for 3 hours, to obtain a crosslinking agent A-4 comprising polycarbonate, both ends of which are modified with isocyanate groups.

Synthetic Example M-1

Preparation of a Mixed Liquid M-1

1.0 g of both ends diol terminated polypropylene glycol (Mn=400, Polymerization degree: 5-7, Wako Pure Chemical Industries, Ltd.) and 0.435 g of tolylene-2,4-diisocyanate (Tokyo Chemical Industry, Co., Ltd.) were mixed, and stirred at 50° C. for 1 hour, to obtain a mixed liquid M-1 comprising polypropylene glycol, both ends of which are modified with isocyanate groups.

Synthetic Example M-2

Preparation of a Mixed Liquid M-2

Into 1.435 g of the mixed liquid M-1 obtained in Synthetic Example M-1, 0.248 g of butyl isocyanate (Wako Pure Chemical Industries, Ltd.) was added, to obtain a mixed liquid M-2 comprising polypropylene glycol, both ends of which are modified with isocyanate groups and polypropylene glycol, one end of which is modified with isocyanate group.

Synthetic Example M-3

Preparation of a Mixed Liquid M-3

1.0 g of both ends diol terminated polypropylene glycol (Mn=400, Polymerization degree: 5-7, Wako Pure Chemical Industries, Ltd.) and 0.485 g of 1,3-bis(isocyanatomethyl)cyclohexane (Tokyo Chemical Industry, Co., Ltd.) were mixed, and stirred at 50° C. for 1 hour, to obtain a mixed liquid M-3 comprising polypropylene glycol, both ends of which are modified with isocyanate groups.

Synthetic Example B

Preparation of a Modified Polyrotaxane

Synthetic Example B-1

Preparation of HAPR

A compound (hereinafter, abbreviating hydroxypropylated polyrotaxane as "HAPR") obtained by hydroxypropylating a part of α-cyclodextrins (hereinafter, abbreviating α-cyclodextrin just as "α-CD") of a polyrotaxane formed of a linear molecule: polyethylene glycol (average molecular weight: 35,000), a cyclic molecule: α-CD, and a capping group: an adamantane amine group was prepared in a manner similar to the method described in WO2005-080469 (whole contents thereof are incorporated herein by reference).

$^1$H-NMR analysis determined α-CD inclusion amount: 25%; introduction ratio of hydroxypropyl group: 48%. Further, GPC determined weight-average molecular weight, Mw: 150,000.

Furthermore, the measurement of the molecular weight and the molecular weight distribution of the synthesized polyrotaxane were carried out by using TOSOH HLC-8220 GPC instrument. The measurement was carried out under the conditions: column: TSK guard column Super AW-H and TSKgel Super AWM-H (two columns are linked); elution solution: dimethylsulfoxide (DMSO)/0.01 M LiBr; column oven: 50° C.; flow rate: 0.5 ml/min; sample concentration of about 0.2 wt/vol %; injection amount: 20 μl; pre-treatment: filtration using a 0.2 μm filter; and the standard molecular weight: PEO (it is the same for Synthetic Examples B-2 and B-3). $^1$H-NMR analysis was carried out by using 400 MHz JEOL JNM-AL400 (manufactured by JEOL Ltd.).

Synthetic Example B-2

Preparation of HAPR-g-PCL 1.0 g of HAPR obtained in Synthetic Example B-1 was placed in a three-necked flask, and while nitrogen was slowly flowed in, 4.5 g of ∈-caprolactone was introduced therein. The mixture was uniformly stirred at 80° C. for 30 minutes using a mechanical stirrer, and then the reaction temperature was raised to 100° C. 0.16 g of tin 2-ethylhexanoate (50 wt % solution) which had been diluted in advance with toluene, was added to the flask, the reaction was continued for 5 hours, and then solvent was removed from the system, to obtain 5.5 g of a reaction product (in which a polycaprolactone group is introduced to HAPR35, and hereinafter, abbreviating "polycaprolactone group introduced to HAPR35" as "HAPR-g-PCL"). The product was analyzed by IR, and a peak originating from an ester at 1736 cm$^{-1}$ was observed. More, GPC determined that the weight average molecular weight, Mw, was 586,800, and the molecular weight distribution, Mw/Mn, was 1.7.

Synthetic Example C

Introduction of Atom Transfer Radical Polymerization Initiation Moiety into Cyclic Molecules in HAPR-g-PCL 3 g of HAPR-g-PCL, 65 mg of N,N-dimethyl-4-aminopyridine, and 5 ml of triethylamine were added, and dissolved in 50 ml of dimethylacetamide under a nitrogen atmosphere. Into the solution, 100 μl of 2-bromoisobutyryl bromide (Tokyo Chemical Industry, Co., Ltd.) was added dropwise with vigorously stirring in an ice bath. The resulting solution was stirred in an ice bath for 1 hour, and then freeze-dried, to obtain HAPR-g-PCL having a 2-bromoisobutyryl group(s), as an atom transfer radical polymerization initiation moiety (moieties), introduced into an end of polycaprolactone.

Example 1

Preparation of Crosslinked Body D-1

0.5 g of HAPR-g-PCL obtained in Synthetic Example B-2 was dissolved in 4.5 g of N,N-dimethylformamide (DMF). Then, into the solution, 0.5 g of the crosslinking agent A-1 was added, and stirred, to obtain a homogeneous solution. The resulting solution was degassed, then poured into a sample mold, and left at 50° C. for 15 hours. The resulting substance was removed from the mold, washed with acetone, dried in vacuo, to obtain a solvent-free crosslinked body D-1 comprising polypropylene glycol having Mn: 3000 and polymerization degree: 50-52 between HAPR-g-PCLs.

Example 2

Preparation of Crosslinked Body D-2

0.5 g of HAPR-g-PCL obtained in Synthetic Example B-2 was dissolved in 4.5 g of DMF. Then, into the solution, 0.5 g of the crosslinking agent A-2 and 5 μl of dibutyl tin dilaurate (Wako Pure Chemical Industries, Ltd.) were added, and stirred, to obtain a homogeneous solution. The resulting solution was degassed, then poured into a sample mold, and left at 50° C. for 15 hours. The resulting substance was removed from the mold, dried in vacuo, to obtain a solvent-free crosslinked body D-2 comprising polypropylene glycol having Mn: 3000 and polymerization degree: 50-52 between HAPR-g-PCLs, and/or polypropylene glycol monobutyl ether having Mn: 2500 and polymerization degree: 40-42 between HAPR-g-PCLs.

Example 3

Preparation of Crosslinked Body D-3

A solvent-free crosslinked body D-3 was obtained in a manner similar to Example 1, except that HAPR-g-PCL obtained in Synthetic Example C was used for HAPR-g-PCL, wherein the crosslinked body D-3 comprises polypropylene glycol having Mn: 3000 and polymerization degree: 50-52 between HAPR-g-PCLs and HAPR-g-PCL has 2-bromoisobutyryl group, as an atom transfer radical polymerization initiation moiety, at one end of polycaprolactone in HAPR-g-PCL.

Example 4

Preparation of Crosslinked Body D-4

Into 174 mg of the crosslinked body D-3, 75 ml of dehydrated dimethylsulfoxide (DMSO) and 2 ml of distilled acrylonitrile were added under a nitrogen atmosphere, and left until swelling equilibrium. After swelling, the resulting solution was nitrogen bubbled for 30 minutes with stirring slowly. Into the resulting solution, 8 mg of copper (I) bromide and 25 mg of 2,2'-bipyridine were added, and the resulting solution was stirred slowly for 20 hours at room temperature. After the reaction, the resulting substance was removed, and washed with DMSO. Then, the solvent replacement with ethanol was carried out, followed by drying in vacuo, to obtain a solvent-free crosslinked body D-4 comprising polyacrylonitrile grafted at one end of a polycaprolactone group in a crosslinked body D-3.

Example 5

Preparation of Crosslinked Body D-5

A solvent-free crosslinked body D-5 was obtained in a manner similar to Example 4, except that 2-cyanoethylacryrate was used instead of acrylonitrile, wherein the crosslinked body D-5 comprises poly(2-cyanoethylacryrate) grafted at one end of a polycaprolactone group in a crosslinked body D-3.

Example 6

Preparation of Crosslinked Body D-6

A solvent-free crosslinked body D-6 was obtained in a manner similar to Example 4, except that 2-hydroxyethylmethacryrate was used instead of acrylonitrile, wherein the crosslinked body D-6 comprises poly(2-hydroxyethylmethacryrate) grafted at one end of a polycaprolactone group in a crosslinked body D-3.

Example 7

Preparation of Crosslinked Body D-7

50 mg of the crosslinked body D-6 was added into 60 ml of a 0.3N sodium hydroxide aqueous solution, and the solution was stirred slowly for 2 hours. Into the solution, 5 ml of distilled acrylonitrile was added, and stirred at room temperature for 15 hours, followed by neutralization with acetic acid. The solvent replacement with acetone was carried out, followed by drying in vacuo, to obtain a solvent-free crosslinked body D-7 comprising poly(2-hydroxyethylmethacryrate) grafted at one end of a polycaprolactone group in a crosslinked body D-6, wherein a hydroxyl group(s) in grafted poly(2-hydroxyethylmethacryrate) is cyanoethylated.

Example 8

Preparation of Crosslinked Body D-8

0.5 g of HAPR-g-PCL obtained in Synthetic Example B-2 was dissolved in a mixed solvent of 0.5 g of DMF and 4 g of xylene. Then, into the solution, 0.5 g of barium titanate (Aldrich, particle diameter: 2 μm or less) was added, and stirred vigorously for 24 hours, to obtain a homogeneous solution. Into the solution, 0.5 g of a crosslinking agent A-1 and 5 μl of dibutyl tin dilaurate (Wako Pure Chemical Industries, Ltd.) were added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body D-8 comprising polypropylene glycol having Mn: 3000 and polymerization degree: 50-52 between HAPR-g-PCLs, and barium titanate in the crosslinked body.

Example 9

Preparation of Crosslinked Body D-9

A solvent-free crosslinked body D-9 was obtained in a manner similar to Example 8, except that an amount of barium titanate was changed from 0.5 g to 0.7 g, wherein the crosslinked body D-9 has a construction similar to the crosslinked body D-8.

Example 10

Preparation of Crosslinked Body D-10

0.415 g of HAPR-g-PCL obtained in Synthetic Example B-2 was dissolved in 3.7 g of DMF. Then, into the solution, 0.623 g of barium titanate (Aldrich, particle diameter: 30-50 nm) was added, and stirred vigorously for 24 hours, to obtain a homogeneous solution. Into the solution, 0.415 g of a crosslinking agent A-1 was added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body D-10 having a construction similar to the crosslinked body D-8.

Example 11

Preparation of Crosslinked Body D-11

A solvent-free crosslinked body D-11 was obtained in a manner similar to Example 8, except that "0.5 g of strontium titanate (Aldrich, particle diameter: 5 μm or less)" was used instead of '0.5 g of barium titanate (Aldrich, particle diameter: 2 μm or less)' used in Example 8, wherein the crosslinked body D-11 comprises polypropylene glycol having Mn: 3000 and polymerization degree: 50-52 between HAPR-g-PCLs, and strontium titanate in the crosslinked body.

Example 12

Preparation of Crosslinked Body D-12

A solvent-free crosslinked body D-12 was obtained in a manner similar to Example 11, except that an amount of strontium titanate was changed from 0.5 g to 0.7 g, wherein the crosslinked body D-12 has a construction similar to the crosslinked body D-11.

Example 13

Preparation of Crosslinked Body D-13

A solvent-free crosslinked body D-13 was obtained in a manner similar to Example 11, except that an amount of strontium titanate was changed from 0.5 g to 1.0 g, wherein the crosslinked body D-13 has a construction similar to the crosslinked body D-11.

Example 14

Preparation of Crosslinked Body D-14

A solvent-free crosslinked body D-14 was obtained in a manner similar to Example 11, except that a particle diameter of strontium titanate used in Example 11 was changed from '5 μm or less' to "10 nm or less", wherein the crosslinked body D-14 has a construction similar to the crosslinked body D-11.

Example 15

Preparation of Crosslinked Body D-15

0.5 g of HAPR-g-PCL obtained in Synthetic Example B-2 was dissolved in a mixed solvent of 1 g of DMF and 3.5 g of xylene. Then, into the solution, 1 g of barium titanate (Aldrich, particle diameter: 2 μm or less) was added, and stirred vigorously for 24 hours, to obtain a homogeneous solution. Into the solution, 1 g of a crosslinking agent A-2 and 5 μl of dibutyl tin dilaurate (Wako Pure Chemical Industries, Ltd.) were added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body D-15 comprising polypropylene glycol having Mn: 3000 and polymerization degree: 50-52 between HAPR-g-PCLs, and/or polypropylene glycol monobutyl ether having Mn: 2500 and polymerization degree: 40-42 between HAPR-g-PCLs, and barium titanate in the crosslinked body.

Example 16

Preparation of Crosslinked Body D-16

A solvent-free crosslinked body D-16 was obtained in a manner similar to Example 15, except that an amount of barium titanate used in Example 15 was changed from 1 g to 1.5 g, wherein the crosslinked body D-16 has a construction similar to the crosslinked body D-15.

Example 17

Preparation of Crosslinked Body D-17

0.31 g of HAPR-g-PCL obtained in Synthetic Example B-2 was dissolved in a mixed solvent of 2.1 g of DMF and 2.1 g of xylene. Then, into the solution, 0.7 g of barium titanate (Aldrich, particle diameter: 2 μm or less) was added, and stirred vigorously for 24 hours, to obtain a homogeneous solution. Into the solution, 0.74 g of a crosslinking agent A-3 and 5 μl of dibutyl tin dilaurate (Wako Pure Chemical Industries, Ltd.) were added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body D-17 comprising polypropylene glycol having Mn: 7600 and polymerization degree: 83-88 between HAPR-g-PCLs, and barium titanate in the crosslinked body.

Example 18

Preparation of Crosslinked Body D-18

0.4 g of HAPR-g-PCL obtained in Synthetic Example B-2 was dissolved in a mixed solvent of 0.4 g of DMF and 3.6 g of xylene. Then, into the solution, 0.8 g of aluminum oxide (particle diameter: 2.5-4.5 μm) was added, and stirred vigorously for 24 hours, to obtain a homogeneous solution. Into the solution, 0.4 g of a crosslinking agent A-1 and 5 μl of dibutyl tin dilaurate (Wako Pure Chemical Industries, Ltd.) were added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body D-18 comprising polypropylene glycol having Mn: 3000 and polymerization degree: 50-52 between HAPR-g-PCLs, and aluminum oxide in the crosslinked body.

Example 19

Preparation of Crosslinked Body D-19

A solvent-free crosslinked body D-19 was obtained in a manner similar to Example 18, except that aluminum oxide (particle diameter: 2.5-4.5 μm) used in Example 18 was changed to aluminum hydroxide (particle diameter: 2 μm), wherein the crosslinked body D-19 has a construction similar to the crosslinked body D-18.

Example 20

Preparation of Crosslinked Body D-20

0.35 g of HAPR-g-PCL obtained in Synthetic Example B-2 was dissolved in 0.5 g of xylene. Then, into the solution, 0.6 g of the mixed liquid M-1 obtained in Synthetic Example M-1 was added, and stirred. The resulting solution was degassed, then poured into a sample mold, and left at 40° C. for 20 hours. The resulting substance was removed from the mold, washed with ethanol, and dried in vacuo, to obtain a solvent-free crosslinked body D-20 comprising polypropylene glycol having Mn: 400 and polymerization degree: 5-7 between HAPR-g-PCLs.

Example 21

Preparation of Crosslinked Body D-21

A solvent-free crosslinked body D-21 was obtained in a manner similar to Example 20, except that the mixed liquid M-2 obtained in Synthetic Example M-2 was used instead of the mixed liquid M-1 obtained in Synthetic Example M-1, wherein the crosslinked body D-21 comprises polypropylene glycol having Mn: 400 and polymerization degree: 5-7 between HAPR-g-PCLs, and polypropylene glycol (Mn: 400 and polymerization degree: 5-7), one end of which is bound to α-cyclodextrin, and another end of which is free from bonding.

Example 22

Preparation of Crosslinked Body D-22

A solvent-free crosslinked body D-22 was obtained in a manner similar to Example 20, except that the mixed liquid M-3 obtained in Synthetic Example M-3 was used instead of the mixed liquid M-1 obtained in Synthetic Example M-1, wherein the crosslinked body D-22 comprises polypropylene glycol having Mn: 400 and polymerization degree: 5-7 between HAPR-g-PCLs.

Example 23

Preparation of Crosslinked Body D-23

HAPR-g-PCL obtained in Synthetic Example B-2 was dissolved in xylene, to prepare a 35 wt % solution of HAPR-g-PCL in xylene. 1.5 g of the solution and 0.48 g of polycarbonate diol (polycarbonate consisting of 96 wt % or more of polyalkylene carbonate diol, 2 wt % or less of 1,5-pentanediol, and 2 wt % or less of 1,6-hexanediol, Duranol (trade mark) T-5650J, Mn: 800, manufactured by Asahi Kasei Chemicals Corp.) were mixed, to obtain a mixed liquid M-4. Into 1.98 g of the mixed liquid M-4, 2.0 g of the crosslinking agent A-4 obtained in Synthetic Example A-4 was added, and stirred. The resulting solution was degassed, poured into a mold such that the resulting substance in the mold has a sheet having thickness of 0.5 mm, and left at 40° C. for 20 hours. The resulting substance was dried in vacuo, to obtain a solvent-free crosslinked body D-23 comprising polycarbonate having Mn: 800 between HAPR-g-PCLs.

Example 24

Preparation of Crosslinked Body D-24

The crosslinked body D-23 obtained in Example 23 was washed with ethanol, and then, dried in vacuo, to obtain a solvent-free crosslinked body D-24.

Comparative Example 1

Preparation of Crosslinked Body X-1

0.5 g of HAPR-g-PCL obtained in Synthetic Example B-2 was dissolved in a mixed solvent of 0.4 g of DMF and 3.6 g of xylene, and stirred, to obtain a homogeneous solution. Into the solution, 70 mg of 1,6-hexamethylene diisocyanates (HMDIC) was added, and stirred, to obtain a homogeneous solution. The resulting solution was degassed, then poured into a sample mold, and left at 50° C. for 15 hours. The resulting substance was removed from the mold, and dried in vacuo, to obtain a solvent-free crosslinked body X-1 comprising hexamethylene moiety between HAPR-g-PCLs.

<Measurement of Dielectric Constant and Initial Modulus>

The dielectric constant and initial modulus were determined for the crosslinked bodies D-1 to D-24 and X-1 obtained in Examples 1 to 24 and Comparative Example 1.

<<Measurement of Dielectric Constant>>

The dielectric constant was determined by using Alpha-S High Resolution Dielectric Analyzer and ZGS Alpha Active Sample Cell manufactured by Novocontrol Technologies GmbH & Co. KG. The sample crosslinked body was located between gold coated brass plates having a diameter of 20 mm, and then, the dielectric constant of the sample crosslinked body was determined at room temperature. Furthermore, in a case where the sample crosslinked body having a diameter less than 20 mm, the measured value was corrected, and calculated value was obtained. The results are shown in Tables 1 to 3.

<<Measurement of Initial Modulus>>

The crosslinked body was processed into the dumbbell type (width: 2.04 mm, initial length: 10 mm), to obtain a sample to be measured. A stress-strain curve for each sample was determined by using TA.XTplus manufactured by STABLE MICRO SYSTEMS LTD. at the tensile rate of 0.2 mm/s. The initial modulus was determined by linearizing the measured stress-strain curve until 5% extension and calculating a slope of the linearization. The results are shown in Tables 1 to 3.

Table 1 shows the relationship with the dielectric constant and initial modulus, depending on a crosslinking agent. Table 1 shows that the material according to the present invention has high flexibility (initial modulus: 1 MPa or less, extension rate: 200% or more), and high dielectric constant (dielectric constant: 6.0 or more).

Table 2 shows the relationship with the dielectric constant and initial modulus, depending on an addition of a functional powder. Table 2 shows that the material according to the present invention having the functional powder has high flexibility (initial modulus: 1 MPa or less, extension rate: 200% or more), and high dielectric constant (dielectric constant: 6.0 or more). Among them, in particular, the addition of barium titanate or strontium titanate provides enhanced dielectric constant (dielectric constant: 10.0 or more).

Table 3 shows the relationship with the dielectric constant and initial modulus, depending on the above-described third or forth graft chain. Table 3 shows that the material according to the present invention having the third or forth graft chain has high flexibility (initial modulus: 10 MPa or less, extension rate: 100% or more). In particular, in comparison with D-3 (dielectric constant: 6.3) having no third or forth graft chain, the material according to the present invention having the third or forth graft chain proves higher dielectric constant (dielectric constant: 8.0 or more).

TABLE 1

Dielectric constant and Initial Modulus of Crosslinked Bodies D-1 to D-2, D-20 to D-24, and X-1

| Crosslinked Body | Crosslinking Agent | Dielectric constant | Initial Modulus (kPa) | Extension (%) |
|---|---|---|---|---|
| D-1 | A-1 | 6.7 | 120 | 200-300 |
| D-2 | A-2 | 7.3 | 60 | 300-400 |

TABLE 1-continued

Dielectric constant and Initial Modulus of Crosslinked
Bodies D-1 to D-2, D-20 to D-24, and X-1

| Crosslinked Body | Crosslinking Agent | Dielectric constant | Initial Modulus (kPa) | Extension (%) |
|---|---|---|---|---|
| D-20 | M-1 | 7.7 | 500 | 350-450 |
| D-21 | M-2 | 7.7 | 150 | 350-450 |
| D-22 | M-3 | 9.4 | 400 | 350-450 |
| D-23 | A-4 | 7.5 | 90 | 750-850 |
| D-24 | A-4 | 7.9 | 270 | 900-1000 |
| X-1 | HMDIC | 4.3 | 3500 | 80-140 |

TABLE 2

Dielectric constant and Initial Modulus
of Crosslinked Bodies D-8 to D-19

| Crosslinked Body | Crosslinking Agent | Dielectric constant | Initial Modulus (kPa) | Extension (%) |
|---|---|---|---|---|
| D-8 | A-1 | 10.6 | 400 | 400-500 |
| D-9 | A-1 | 11.6 | 500 | 400-500 |
| D-10 | A-1 | 14.4 | 50 | 400-500 |
| D-11 | A-1 | 10.2 | 500 | 200-300 |
| D-12 | A-1 | 11.3 | 500 | 400-500 |
| D-13 | A-1 | 13.0 | 600 | 400-500 |
| D-14 | A-1 | 16.7 | 90 | 350-400 |
| D-15 | A-2 | 11.5 | 75 | 400-500 |
| D-16 | A-2 | 15.6 | 100 | 400-500 |
| D-17 | A-3 | 12.1 | 120 | 250-300 |
| D-18 | A-1 | 7.3 | 700 | 200-250 |
| D-19 | A-1 | 9.3 | 3300 | 400-450 |

TABLE 3

Dielectric constant and Initial Modulus
of Crosslinked Bodies D-3 to D-7

| Crosslinked Body | Crosslinking Agent | Dielectric constant | Initial Modulus (kPa) | Extension (%) |
|---|---|---|---|---|
| D-3 | A-1 | 6.3 | 160 | 250-300 |
| D-4 | A-1 | 8.0 | 1750 | 300-400 |
| D-5 | A-1 | 8.1 | 730 | 300-350 |
| D-6 | A-1 | 8.7 | 10000 | 150-250 |
| D-7 | A-1 | 16.1 | 4000 | 350-400 |

What is claimed is:

1. A material comprising a first polyrotaxane and a second polyrotaxane,
wherein the first polyrotaxane comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s),
the second polyrotaxane comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s),
the first and second polyrotaxanes are crosslinked with each other via the first and second cyclic molecules,
the material is free from solvent,
the material has a dielectric constant at 1 kHz of 6.0 or more, and
the material comprises at least one powder, which imparts said dielectric constant to the material, selected from the group consisting of metal oxides, metal hydroxides, metals and carbon, and the metal oxide is selected from the group consisting of $MgSiO_4$, $MgTiO_3$, $ZnTiO_3$, $Zn_2TiO_4$, $CaTiO_3$, $SrTiO_3$, $SrZrO_3$, $BaTiO_3$, $BaTi_2O_5$, $BaTi_4O_9$, $Ba_2Ti_9O_{20}$, $Ba_2(Ti, Sn)_9O_{20}$, $ZrTiO_4$, $(Zr, Sr)TiO_4$, $BaNd_2Ti_5O_{14}$, $BaSm_2TiO_{14}$, $Bi_2O_3BaONd_2O_3TiO_2$, $PbOBaONd_2O_3TiO_2$, $(Bi_2O_3, PbO)BaONd_2O_3TiO_2$, $La_2Ti_2O_7$, $Nd_2Ti_2O_7$, $(Li, Sm)TiO_3$, $Ba(Mg_{1/3}Ta_{2/3})O_3$, $Ba(Zn_{1/3}Ta_{2/3})O_3$, $Ba(Zn_{1/3}Nd_{2/3})O_3$, and $Sr(Zn_{1/3}Nd_{2/3})O_3$.

2. The material according to claim 1, wherein the material has an initial modulus of 10 MPa or less.

3. The material according to claim 1, wherein the material has a polymeric moiety between the first and second cyclic molecules, and the polymeric moiety has at least 5 repeating units, which may be selected from the group consisting of polyethers, polyesters and polycarbonates.

4. The material according to claim 3, wherein the polymeric moiety has a number average molecular weight ranging from 300 to 10000.

5. The material according to claim 3, wherein each of the first and second cyclic molecules has a first active group and a second active group, respectively,
the polymeric moiety has a first reactive group and a second reactive group at both ends,
the first active group and the first reactive group are, and the second active group and the second reactive group are directly bound to each other via a chemical bonding to form crosslinking.

6. The material according to claim 1, wherein the first cyclic molecule and/or second cyclic molecule each has a first graft chain and/or a second graft chain, each of the first graft chain and/or the second graft chain are/is independently selected from the group consisting of polyesters and polycarbonates, and a copolymer thereof.

7. The material according to claim 3, wherein each of the first cyclic molecule and/or the second cyclic molecule has the first graft chain and/or the second graft chain, each of the first graft chain and/or the second graft chain is selected from the group consisting of polyesters and polycarbonates, and a copolymer thereof,
the first cyclic molecule and/or the second cyclic molecule are/is crosslinked via a part of or all of the first graft chain, and/or via a part of or all of the second graft chain, and via the polymeric moiety.

8. The material according to claim 6, wherein each of the first cyclic molecule and/or the second cyclic molecule has a third graft chain and/or a forth graft chain, each of which is derived from a monomer having a hydroxyl group or a monomer having a cyano group.

9. The material according to claim 1, wherein the at least one powder is selected from the group consisting of metal oxides, metal hydroxides, metals and carbon, and the metal oxide is barium titanate or strontium titanate.

10. The material according to claim 9, wherein the powder is barium titanate or strontium titanate.

11. A method for producing a material comprising a first polyrotaxane and a second polyrotaxane, wherein the first and the second polyrotaxanes are crosslinked, the material is free from solvent, and the material has a dielectric constant at 1 kHz of 6.0 or more, comprising the steps of:

(a) preparing the first polyrotaxane, which comprises a first pseudopolyrotaxane, which has a first linear molecule and a first cyclic molecule(s) in which the first linear molecule is included in a cavity (cavities) of the first cyclic molecule(s) in a skewered manner, and first capping groups, each of which locates at each end of the first pseudopolyrotaxane in order to prevent the dissociation of the first cyclic molecule(s);

(b) preparing the second polyrotaxane which comprises a second pseudopolyrotaxane, which has a second linear molecule and a second cyclic molecule(s) in which the second linear molecule is included in a cavity (cavities) of the second cyclic molecule(s) in a skewered manner, and second capping groups, each of which locates at each end of the second pseudopolyrotaxane in order to prevent the dissociation of the second cyclic molecule(s);

(c) preparing a crosslinking agent comprising a polymeric moiety having at least 5 repeating units, which is selected from the group consisting of polyethers, polyesters and polycarbonates;

(d) mixing and reacting the first polyrotaxane, the second polyrotaxane, and the crosslinking agent, to crosslink the first and second polyrotaxanes via the polymeric moiety; and (e) adding to the material at least one powder, which imparts said dielectric constant to the material, selected from the group consisting of metal oxides, metal hydroxides, metals and carbon, and the metal oxide is selected from the group consisting of $MgSiO_4$, $MgTiO_3$, $ZnTiO_3$, $Zn_2TiO_4$, $CaTiO_3$, $SrTiO_3$, $SrZrO_3$, $BaTiO_3$, $BaTi_2O_5$, $BaTi_4O_9$, $Ba_2Ti_9O_{20}$, $Ba_2(Ti, Sn)_9O_{20}$, $ZrTiO_4$, $(Zr, Sr)TiO_4$, $BaNd_2Ti_5O_{14}$, $BaSm_2TiO_{14}$, $Bi_2O_3BaONd_2O_3TiO_2$, $PbOBaONd_2O_3TiO_2$, $(Bi_2O_3, PbO)BaONd_2O_3TiO_2$, $La_2Ti_2O_7$, $Nd_2Ti_2O_7$, $(Li, Sm)TiO_3$, $Ba(Mg_{1/3}Ta_{2/3})O_3$, $Ba(Zn_{1/3}Ta_{2/3})O_3$, $Ba(Zn_{1/3} Nd_{2/3})O_3$, and $Sr(Zn_{1/3}Nd_{2/3})O_3$;

to obtain the material.

12. The method according to claim 11, wherein the at least one powder is selected from the group consisting of metal oxides, metal hydroxides, metals and carbon, and the metal oxide is barium titanate or strontium titanate.

13. The method according to claim 12, wherein the powder is barium titanate or strontium titanate.

* * * * *

UNITED STATES PATENT AND TRADEMARK OFFICE
CERTIFICATE OF CORRECTION

PATENT NO. : 8,658,725 B2
APPLICATION NO. : 13/580373
DATED : February 25, 2014
INVENTOR(S) : K. Inoue et al.

It is certified that error appears in the above-identified patent and that said Letters Patent is hereby corrected as shown below:

In the Claims

| COLUMN | LINE | ERROR |
|---|---|---|
| 28 | 14-15 | "$(Bi_2O_3, PbO)BaONd_2O_3TiO_2$," should read |
| (Claim 1, | lines 32-33) | --$(Bi_2O_3, PbO)BaONd_2O_3TiO_2$,-- |

Signed and Sealed this
Fifth Day of August, 2014

Michelle K. Lee
*Deputy Director of the United States Patent and Trademark Office*